Dec. 28, 1937.   V. CRANFORD   2,103,247
SIGNAL MEANS
Filed May 27, 1935   3 Sheets-Sheet 1
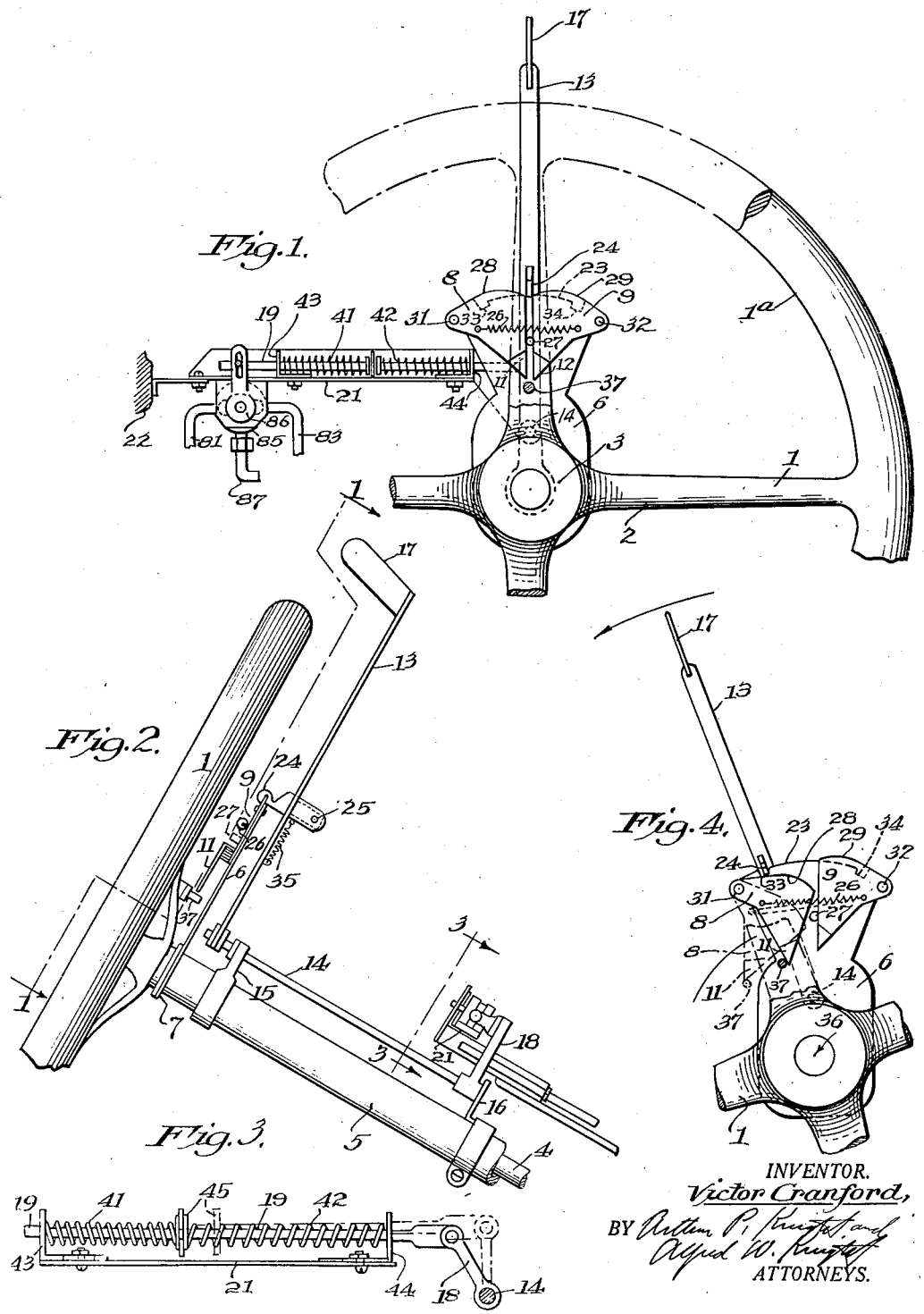
INVENTOR.
Victor Cranford,
BY
ATTORNEYS.

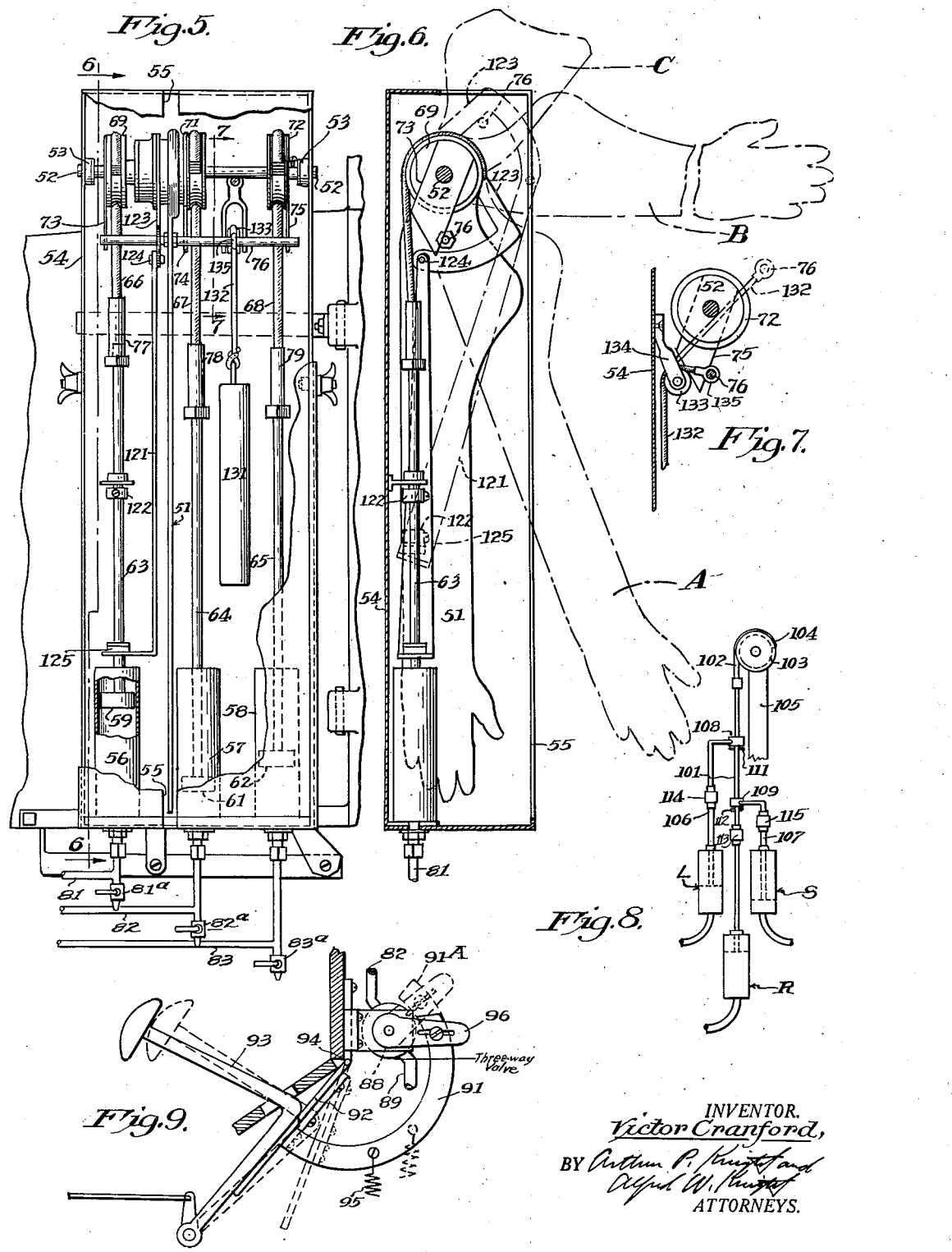

Dec. 28, 1937.   V. CRANFORD   2,103,247
SIGNAL MEANS
Filed May 27, 1935   3 Sheets-Sheet 3
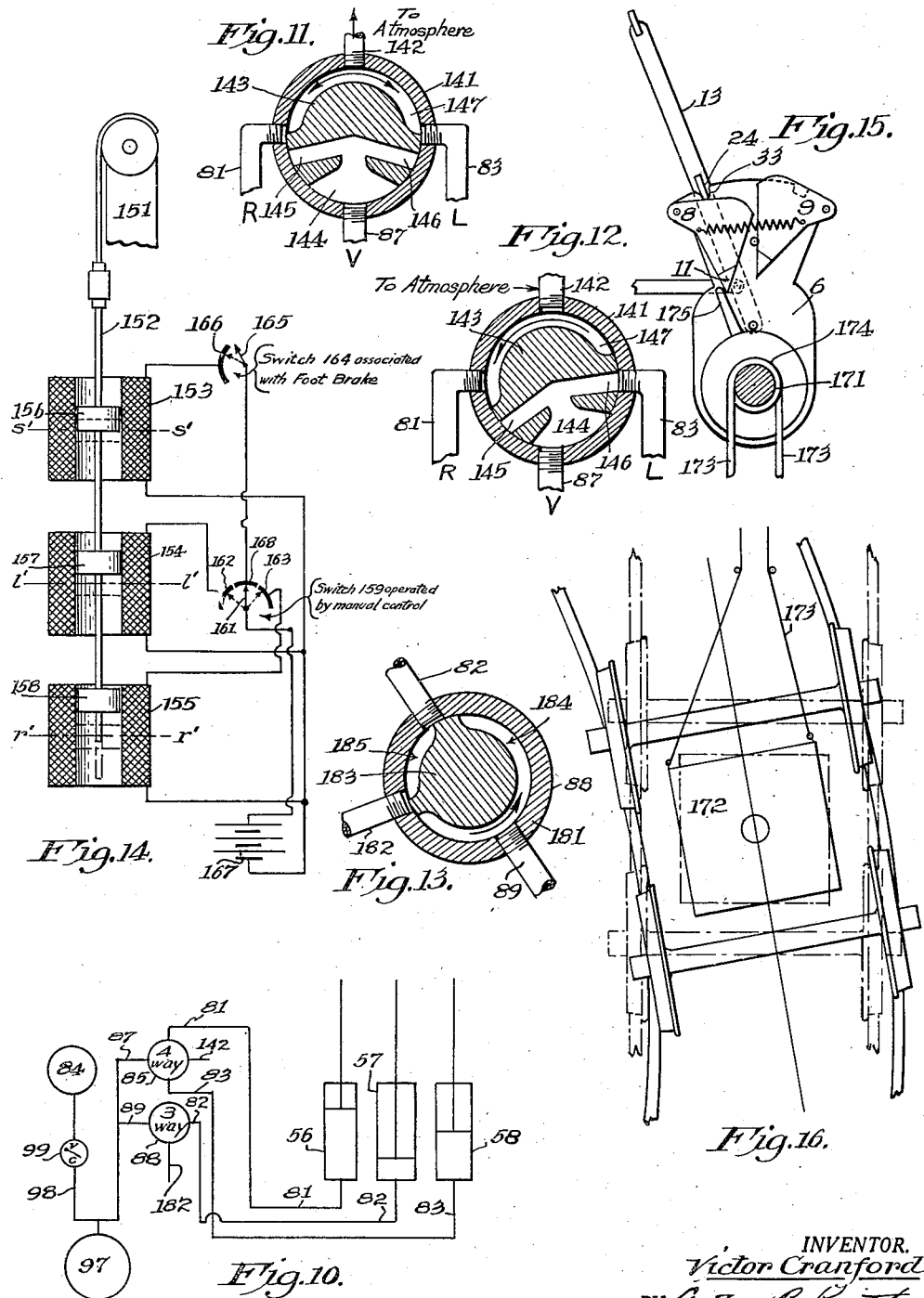
INVENTOR.
Victor Cranford,
BY
ATTORNEYS.

Patented Dec. 28, 1937

2,103,247

UNITED STATES PATENT OFFICE 2,103,247

SIGNAL MEANS

Victor Cranford, San Fernando, Calif.

Application May 27, 1935, Serial No. 23,560

1 Claim. (Cl. 116—36)

This invention relates to signaling devices for vehicles, such as automobiles, trucks, trains, street-cars, boats, and the like, and particularly to a signal device for indicating a contemplated change in the course of such a vehicle, references herein to "change in course" of a vehicle being understood to include both a change in direction of a vehicle or a change in speed, such as a right turn, left turn, slowing or stopping.

The principal object of the invention is to provide a signal device for motor vehicles which provides for automatic return from signaling or indicating position to normal position after the desired change in the course of such vehicle is effected.

One of the particular objects of the invention is to provide a direction signal for vehicles in which movement thereof from a normal or non-indicating position to indicating position is obtained through manual operation of a suitable control means, and return of said signal to said non-indicating position is effected through a change in the course of the vehicle itself.

A further object of the invention is to provide a signaling means which may be associated with a vehicle adapted to operate on a fixed course, such as a street-car or the like, in which movement of such signal from a normal or non-indicating position to indicating position is obtained through manual operation of a suitable control means and return of said signal to non-indicating position is effected through a change in position of a portion of such vehicle with respect to the main body of such vehicle in response to travel of such vehicle over said fixed course.

A further object of the invention is to provide a signaling means for a motor vehicle provided with an internal combustion engine, which is associated with the intake manifold of such internal combustion engine in such manner that the reduced pressure in such manifold is employed to effect operation of the device from non-indicating to indicating position, and to cause the same to persist in such position, responsive to the setting of valve means under control of the operator of such vehicle.

A further object of the invention is to provide a device of the character described provided with an improved form of manually operated control means which may be moved to position to cause movement of the signal device to the desired indicating position but which will automatically move to return the signaling device to non-indicating position in response to movement of the steering apparatus of the vehicle.

The device of the present invention may comprise a combination of a signal indicator, indicator operating means, a source of energy for causing said operating means to function, a switching means for effecting selective operative association of said operating means and said source of energy, and control means associated with said switching means. The signal indicating means may comprise any suitable type of device adapted to be disposed in any one of a plurality of signaling positions or to otherwise provide any one of a plurality of identifying signals. Such means may advantageously comprise a semaphore arm, a rotatable drum carrying a plurality of signal legends, a plurality of lights of different color, or the like, the semaphore arm being specifically described herein as a preferred type. The character of the operating means for the signal indicating means will be dependent upon the particular type of signal indicating means employed, that is, where a semaphore arm or a rotating drum such as above described is employed the operating means may comprise one or more fluid actuated pistons operatively associated therewith, or one or more electrical means such as solenoids or the like. Where a plurality of colored lamps are employed the electric bulbs themselves may be considered as the operating means. The source of energy may also be dependent upon the specific type of indicating means employed, i. e., a supply of fluid under pressure, a storage battery, or the like. The switching means may comprise valve means where the operating means is fluid actuated, or may comprise electrical switching means where the operating means is electrically actuated. The control means preferably comprises a movable lever member in position to be operated by muscular effort on the part of the operator of the vehicle, as through the agency of the operator's hand or foot, and the portion of such means which controls the positioning of the indicating means with respect to signals which indicate a proposed change in direction of the vehicle, i. e., a right or left turn, is preferably operatively associated with the steering apparatus for the vehicle, or with some other portion of the vehicle which changes position with respect to the main body of the vehicle in response to a turning movement of said vehicle, in such manner that when moved by the operator to a desired setting it will remain in such setting while the vehicle is turning to deviate from a straight course but will be dislodged from such setting and allowed to return to neutral position when the vehicle begins to resume a straight course.

Other objects of the invention will be brought out in the ensuing description of certain embodiments thereof, or will be apparent therefrom, and referring to said drawings:

Fig. 1 is a partly broken-away view of an automobile steering wheel showing the control device of the present invention associated therewith, said view being taken on line 1—1 in Fig. 2;

Fig. 2 is a side view thereof;

Fig. 3 is a detail thereof taken on line 3—3 in Fig. 2, showing the switch-operating portion of the device in a position corresponding to the setting of the control lever as shown in Fig. 4;

Fig. 4 is a fragmentary view corresponding to Fig. 1, showing the control device in a "left turn" position;

Fig. 5 is a front elevation of one form of the signal indicating device and its operating means;

Fig. 6 is an end sectional elevation thereof taken on line 6—6 in Fig. 5;

Fig. 7 is a fragmentary view thereof taken on line 7—7 in Fig. 5;

Fig. 8 is a partly diagrammatic view of a modified form of signal operating means;

Fig. 9 is a detail of a form of valve operating means which may be associated with a brake pedal or the like for controlling one position of the signal indicating means;

Fig. 10 is a diagrammatical view showing the manner of associating an indicator operating means, and control valve means for effecting operation of the operating means to "right turn", "left turn", and "stop" positions;

Fig. 11 is a sectional view of one form of valve means which may be associated with a manual control means of the present invention, this figure indicating a "neutral" or non-indicating setting;

Fig. 12 is a view corresponding to Fig. 11 showing the valve means in a "left turn" setting;

Fig. 13 is a view corresponding to Fig. 11, showing a form of valve means which may be associated with a brake pedal or the like according to the present invention;

Fig. 14 is a partly diagrammatic showing of an electro-magnetic type of signal operating means;

Fig. 15 is a view corresponding generally to Fig. 4, showing a modified form of control device, in left turn position, which may be associated with a street-car "truck" or the like; and Fig. 16 is a diagrammatic showing of a street-car truck with which the device shown in Fig. 14 may be associated.

Referring particularly to Figs. 1 to 4, the conventional automobile steering wheel is indicated at 1, comprising a rim portion 1ᵃ provided with spokes 2 secured to a hub 3 which is suitably mounted on a steering post 4 disposed within a stationary tube or the like 5. The control device is preferably mounted on the tube 5 and may comprise a frame member 6 secured to said tube as at 7 and provided at its upper end with two pivotally mounted release members 8 and 9. The release members 8 and 9 are provided with inwardly extending projections 11 and 12 which are preferably raised slightly from the portion 6 as shown in Fig. 2, for the purpose of facilitating engagement thereof with pin or lug actuating means for operation thereof as hereinafter described. Below the member 6, I provide an operating lever 13 mounted on a short shaft 14 pivotally secured to the post 5 as by means of bearings 15 and 16. The lever 13 is preferably provided with a projecting end portion 17 for engagement by the hand of the operator and the shaft 14 carries at its lower end a crank member 18 linked to a switch-actuating rod 19 mounted on a suitable supporting element 21 which may be secured to a fixed portion of the body of the automobile, as shown at 22.

The outer portion of the member 6 is provided with an arcuate edge 23 which has the axis of the shaft 14 as a center and a suitable latch member 24 pivotally mounted on the lever 13 as at 25 is provided in position to engage said edge 23. The release members 8 and 9 are provided with a tension spring 26 biasing the projections 11 and 12 toward one another against a centrally disposed stop member 27, and the upper or outer edge portions 28 and 29 of said release members are preferably cam shaped with respect to the pivotal mounting thereof at 31 and 32 whereby movement of the latch member 24 along the edge 23 in a left-hand direction will effect a clockwise rotation of the release member 8 and movement thereof in a right-hand direction will effect a counter-clockwise rotation of the release member 9. At each end of the arcuate edge 23 I provide an inwardly directed notch or detent means, as shown at 33 and 34, into which the latch member 24 may be urged by a suitable tension spring 35 mounted on lever 13, causing said lever 13 to persist in either a right-hand or left-hand position, a left-hand position thereof being indicated in Fig. 4.

When one of the release members, for example the member 8, is rotated about its pivot 31 from its normal position in Fig. 1 to the position shown in solid lines in Fig. 4, the projection 11 will be brought closer the axis of rotation 36 of the steering wheel 1, and I provide one or more actuating members such as depending lugs or pins 37 secured to said steering wheel in any suitable manner, as at one or more of the spokes 2, said lug projecting downwardly toward the member 6 in position to engage said projection 11. Assuming an actuating member or pin 37 to be to the right of the projection 11, upon rotating the steering wheel in a counter-clockwise direction and the pin 37 will bear against the right-hand edge of the projection 11, as may be visualized from Fig. 4, and the release member 8 will be rotated in a clockwise direction to some such position as indicated in dot-dash lines in said figure, the position of the pin 37 at that instant being also shown in dot-dash lines. As the pin 37 passes the tip of the projection 11, said projection will be moved in a counter-clockwise direction due to the tension of spring 26 until the edge thereof 28 engages the latch 24, the spring 35 associated with said latch 24 being of adequate strength to prevent dislocation of said latch from the detent means or notch 33 due to such movement. Thus, assuming the lever 13 to be moved to this left position to control the signal indicating means for a left-hand turn as will be subsequently described, rotation of the steering wheel 1 in a left-hand or counter-clockwise direction will not disturb the setting of said lever. After the vehicle has turned to the left a sufficient amount, the wheel 1 will be rotated in a right-hand or clockwise direction by the operator and when the pin 37 engages the projection 11 as shown in full lines in Fig. 4 further movement of the wheel in a right-hand direction will force the edge 28 of the release member 8 against the latch 24 and move said latch clear of the notch 33. Associated with the lever 13 and its shaft 14 et cetera I provide a spring means which tends to maintain said lever in the central or neutral position shown in Fig. 1, so that when the latch 24 is released as above described, said lever will return to said neutral position. This spring means may advantageously comprise two opposing spring members 41 and 42 disposed about the rod 19, the respective left and right-hand ends of the springs 41 and 42 bearing against suitable adjustably mounted stop members 43 and 44 mounted on the supporting element 21 and the respective right and left-hand ends of said springs bearing against a pin or other stop member 45 secured to the rod 19. When the lever 13 is in the left-hand position shown in Fig. 4, the spring 41 will thus be compressed from its normal state and will serve to bias said lever to neutral position upon release of the latch 24.

Operation of the lever 13 to and from a right-hand position will be understood to be entirely comparable to the above-described operation thereof to and from the left-hand position, and no further description thereof is believed necessary.

The signal indicator and the operating means therefor are shown in Figs. 5 to 7, and may comprise a semaphore arm 51 mounted on a shaft 52 journaled on suitable bearings 53 disposed on a casing 54 provided with a slot 55 in the forward face thereof through which said arm may extend in signal-indicating position. As will be apparent from a consideration of these figures, the arm 51 is adapted to assume any desired position with respect to the vertical, to indicate the vehicle operator's intended change in the operation of the vehicle. Three arm signals are customarily employed in automobile operation; the operator generally indicating a contemplated stop or deceleration by extending his left arm (assuming a left-hand drive vehicle) in a downwardly inclined position; a left-turn by extending the left arm horizontally outwardly, and a right-turn by extending the arm in an upwardly inclined position. These positions are indicated in Fig. 6 at A, B, and C, respectively. It will be appreciated that in any locality where custom has established signal indications other than the above, the associated parts of the present-described mechanism may be re-associated in their correct relation to the desired signals.

The operating means for the semaphore arm 51 may comprise a plurality of fluid operated cylinders 56, 57, and 58, provided with pistons 59, 61, and 62, respectively, and these pistons are provided with piston-rods 63, 64, and 65 secured to flexible cables 66, 67, and 68. The cables 66, 67, and 68 wrap around and are secured to pulleys 69, 71, and 72 which are carried by and freely rotatable on the shaft 52. The pulleys are respectively provided with radially projecting lifter-arms 73, 74, and 75 which normally extend downwardly in position to bear against a lifter-bar 76 extending parallel to the shaft 52 and secured to the arm 51, the lifter-arm 73 for the pulley 69 being shown in full-line position in Fig. 6.

As shown in these figures, three separate cylinders and piston assemblies are provided for the three described signal positions, and in order to raise the semaphore arm 51 to the required distance or elevation to indicate the desired signal, I so arrange the length of the cables 66, 67, and 68 through the agency of adjusting connectors 77, 78, and 79 so that the respective pistons 59, 61, and 62 are disposed at different distances from the bottom of the respective cylinders. The right-turn indicating position C requires the greatest downward movement, and the piston 59 is thus placed near the top of the cylinder 56. The left-turn signal requires less downward movement, and the piston 62 is thus placed at a lower position within the cylinder 58 than the corresponding piston 59. Similarly, the piston 61 which provides the signal for stopping or deceleration of the vehicle is provided with a relatively short stroke, as by being positioned near the bottom of the cylinder 57. The above arrangement of three separate cylinders and pistons is illustrative only, and it will be obvious that the control means of this invention may be adapted to signalling devices other than those shown.

Fig. 8 illustrates a construction in which the three operating cylinders and pistons are associated with a common operating rod for effecting movement of a signal arm to the three required positions, and referring thereto, the right-turn cylinder is shown at R, the left-turn cylinder is shown at L, and the stop cylinder is shown at S, the piston for the cylinder R being shown as operating directly on an operating rod 101 which carries a flexible cable or the like 102 secured to the periphery of a rotatably mounted drum 103 as at 104, said drum carrying a signal arm 105. The cylinders L and S are operatively associated with the rod 101 through rods 106 and 107 provided with collars 108 and 109 slidably disposed on the rod 101, suitable stop members 111 and 112 being provided on said rod 101 for engagement by said collars. If desired, suitable turnbuckles or the like may be provided for the respective rods as at 113, 114, and 115, so that the desired stroke of the respective pistons may be adjusted to give the required signal indication, the length of stroke for the respective pistons being arranged as above described. It will be appreciated that the flexible cable portion 102 may be made as long as required, whereby the cylinder and piston assembly may be disposed at some convenient portion of the vehicle, for example, under the floor boards, and the operating cable carried over suitable pulleys to the semaphore arm, which may be disposed at any desired location on the vehicle.

In view of the fact that movement of the semaphore arm 51, or comparably the arm 105, from normal position to right-turn indicating position C is necessarily relatively rapid so that the desired signal may be promptly given, I prefer to provide some means for absorbing the principal proportion of the momentum of said arm near the top position, and for this purpose I may employ a link member 121 having its lower end slidably disposed about the rod 63 and its upper end associated with the lifter-bar 76, whereby a downward movement of the rod 63 will be accompanied by an upward movement of the link 121, and stop means 122 are provided on said rod 63 for engagement with the link 121 at the proper position corresponding to a semaphore arm position C. The association of the link 121 with the lifter-bar 76 may be obtained through an arm 123 pivotally mounted on the shaft 52 and positioned for engagement by the said bar 76 during movement thereof with the semaphore arm 51, the link 121 being pivotally secured to the arm 123 as at 124. The position assumed by the link means when the semaphore is in position C is shown in dot-dash lines in Fig. 6, it being seen that the lifter-bar 76 is in engagement with the arm 123 and the lower end portion of the link 121 is in engagement with the stop member 122, suitable shock absorbing means being preferably provided between the lower end of the link 121 and said stop member 122, such as rubber washers or the like 125.

Return of the semaphore arm 51 from position A to normal or non-indicating position shown in full lines in Fig. 6 may be somewhat sluggish due to the relatively small gravity component on said arm and I prefer to provide for biasing the arm into the normal position. Such biasing means may comprise a weight member 131 secured to a flexible cable 132 which passes over a pulley or the like 133 suitably secured to the casing 54 as thru a hanger 134, said cable being secured to the lifter-bar 76 as at 135. The upper edge of the pulley 133 is preferably disposed approximately horizontally with regard to the lifter-bar 76 so that the full effect of the weight 131 may be utilized to force the arm 51 inwardly, and it is apparent that this weight will have comparatively little effect upon the arm 51 when said arm is in position C inasmuch as the lifter-bar 76 and the cable 132 will then be in the position shown in dot-dash lines in Fig. 7, in which the force of said weight is applied substantially on a line passing through the center of rotation of the arm (shaft 52) and the lever arm thereon is relatively short.

As shown in Fig. 10, the indicator-operating means, i. e., the cylinders, pistons, and the associated cables may be operated by atmospheric pressure against the upper wall of said pistons, the lower ends of the cylinders 56, 57, and 58 being provided with connections 81, 82, and 83 which connect with the intake manifold 84 of the internal combustion engine of the vehicle with which the device may be associated, thus providing a reduced pressure against which such atmospheric pressure may act. The connections 81, 82, and 83 are preferably provided with drain cocks 81ª, 82ª, and 83ª, as shown in Fig. 5, whereby accumulated moisture and oil may be periodically drained away. The "right" and "left" turn cylinders 56 and 58 communicate with the intake manifold 84 thru a four-way valve 85 operated by the rod 19 through the agency of a crank 86, a suitable connection 87 leading from said valve to said manifold. The connection 82 for the "stop" cylinder 57 communicates with the manifold 84 through a three-way valve 88 which is provided with operating means associated with the brake pedal of the vehicle, as shown in Fig. 9, a connection 89 being provided from said valve 88 to the intake manifold 84. The valves 85 and 88 are preferably provided with connections 142 and 182 open to the atmosphere, as more fully described hereinafter.

The operating means for the valve 88 may comprise an arcuate arm 91 secured to a plate or arm 92 pivotally mounted adjacent the brake lever 93, for example, on the dash-board as at 94. A suitable tension spring 95 is provided to bias the member 92 against the brake lever 93 so that as the brake lever is depressed to operating position such as shown in dot-dash lines in said figure, the arcuate member 91 will be moved to some such position as is shown in dot-dash lines at 91A. A suitable operating arm 96 is provided for the valve 88 which may be pivotally engaged by the arm 91 whereby movement of said arm 91 in the above described manner will effect a rotation of the valve stem.

In view of the fact that under some conditions, for example, when the internal combustion engine is being strongly accelerated, the vacuum in the intake manifold 84 may drop appreciably, a vacuum reserve tank is preferably provided as at 97 which communicates through a connection 98 and a check valve 99 to said manifold 84, the respective connections 89 and 87 to the valves 88 and 85 being connected to the connection 98 at the same side of the check valve 99 as the tank 97. With this arrangement, temporary loss of vacuum in the intake manifold will not prevent normal operation of the signal arm, due to the low pressure which is established in the tank 97. It will be appreciated that this tank may be disposed in any convenient location, as under the body of the car or under the running board.

In Figs. 11 and 12 I have shown a form of four-way valve which may be advantageously employed at 85 according to the present invention, said valve being operatively connected to the crank 86 which is associated with the actuating rod 19. This valve may comprise a casing 141 provided with a vacuum connection 87, a right-turn connection 81, a left-turn connection 83, and a connection 142 communicating with the atmosphere. The casing 141 is provided with a rotatable plug 143 which is provided with a port 144 in position to register with the connection 87 and branching into side ports 145 and 146 in position to register respectively with the connections 81 and 83 in right and left-turn positions of the lever 13. The plug 143 is also provided with a port 147 which will establish communication between the connections 81, 83, and the connection 142 when the valve plug is in neutral position as shown in Fig. 11 so that after operation of either the right or left-turn cylinders, connection will be established to the atmosphere to relieve the reduced pressure in such cylinder and allow the semaphore arm to return to normal or non-indicating position, as will be apparent to one skilled in the art.

In Fig. 13 I have shown a form of three-way valve which may be employed at 88, which may comprise a casing 181 provided with a vacuum connection 89, a connection 82 leading to the cylinder 57, and a connection 182 leading to the atmosphere. A rotatable plug is provided at 183, having a port 184 in position to register with the connections 89 and 82 when the lever 96 is turned to the position indicated at 91A in Fig. 9, and having a port 185 in position to register with the connections 82 and 182 when the valve is in closed position as shown, opening the cylinder 57 to the atmosphere.

Fig. 14 illustrates an electromagnetic device for operation of a signal indicator such as a semaphore arm 151, and may comprise an operating rod 152 extending axially thru a plurality of solenoids 153, 154, and 155, said solenoids providing for operation of the semaphore arm to stop, left turn, and right turn positions respectively. Suitable soft iron armatures are provided at various positions along the length of the rod 152 as at 156, 157, and 158, the relative strokes of the rod 152 for the several indicating positions being established by displacement of the respective armatures from the center lines s'—s', l'—l', and r'—r' of said solenoids. Upon energization of the solenoid 153 the armature 156 will seek the center line s'—s', elevating the semaphore 151 to position corresponding to that shown at A in Fig. 6. Energization of the solenoid 154 will cause the armature 157 to seek the center line $l'$—$l'$, causing the semaphore to move to position shown at B in Fig. 6, and, correspondingly, energization of the solenoid 155 will cause the armature 158 to seek the center line $r'$—$r'$ and effect movement of the semaphore arm to the position shown at C in Fig. 6. This type of operating means, while positive in movement, will cause a slight oscillating movement of the signal arm when moved to any one signal indicating position, a feature which is of some advantage inasmuch as the signal attracts more attention by such movement. This oscillating movement is occasioned by the respective armatures seeking the center lines of the solenoids, and may be eliminated or diminished to the desired extent by providing adequate damping means for the rod 52, as will be apparent to one skilled in electrical arts. The control means such as shown in Figs. 1 to 4 will be associated with electrical switching means when this type of operating means is employed, instead of with valve means as above described, and a suitable type of switching means is indicated at 159 which may comprise a brush 161 operatively associated with the crank 86 and the arm 19, adapted to contact a segment 162 associated with the solenoid 154 when the lever 13 is moved to left-turn-indicating position, or to contact a segment 163 associated with the solenoid 155 when the lever 13 is moved to right-turn-indicating position. The solenoid 153 may be controlled by a switch 164 which may be associated with the foot brake after the manner of the three-way valve 88, which switch may comprise a brush 165 adapted to contact a segment 166, associated with said solenoid 153, upon operation of the brake pedal. The switches 159 and 164 are provided with suitable connection to a battery 167, and supply of energy to the switch 164 is preferably established only when the manual control means is in neutral or non-indicating position, as by connecting the brush 165 to a contact segment 168 on the switch 159 after the manner shown. This arrangement will prevent energization of the solenoid 153 by operation of the brake pedal when either the solenoid 154 or 155 is energized.

Figs. 15 and 16 illustrate the application of the present invention to a non-dirigible vehicle, such as a street-car or the like, in which application a rotatable drum 171 is substituted for the steering wheel 1 shown in Figs. 1 to 4, said drum being rotatable in response to movement of a portion of the vehicle with respect to the main body of such vehicle during the turning movement of the vehicle, such as a four-wheel truck 172 as shown in Fig. 16. The operative association of the drum 171 with the truck 172 may be obtained through a cable 173 having its ends attached to opposite sides of the truck 172 and its inner portion wrapped around the drum 171 as at 174. As described above in connection with Figs. 1 to 4, when a change in course of the vehicle is contemplated, the operator moves the lever 13 to the right or left, dependent upon the turn to be made, causing operation of the signal-indicating device. In Fig. 15 the lever 13 is shown in left-turn-indicating position, with the latch 24 engaged in the notch 33 in the frame member 6 and the release member 8 moved out of normal position. Movement of the truck 172 from the dot-dash position to the full line position shown in Fig. 16 will cause a rotation of the drum 171 in a counter-clockwise direction, and a lug 175 mounted on the drum 171 will pass said member 8 in the same manner as described above in connection with the pin 37, without disturbing the latch 24. When the truck moves from the full line position toward the dot-dash line position, the drum 171 will be rotated in a clockwise direction and the lug 175 will engage the portion 11 of the member 8 and force the latch 24 from the notch 33, following which the spring assembly 41 and 42 will return the lever to neutral or non-indicating position.

It will be apparent that any other portion of the vehicle which has a movement relative to the main body of the vehicle to which the control means shown in Fig. 15 is attached, may be employed to rotate the drum 171. For example, the trolley mechanism with which a street-car is customarily provided may be provided with a drum or the like and the cable 173 passed around this drum and the drum 171.

Numerous modifications of the various elements of this invention will occur to one familiar with the art, and I do not choose to be limited to the specific embodiments herein disclosed, but rather to the scope of the appended claim.

I claim:

In combination with a vehicle having a body portion and a portion movable relative to said body portion during a change in course of said vehicle, a signal indicator control device which comprises: lever means pivotally mounted for movement to positions to the right and left sides, respectively, of a central neutral position, said lever means being provided with operative association with a signal indicator to effect operation of said indicator to right-turn and left-turn indicating positions upon movement of said lever means to the respective right and left side positions; spring means biasing said lever means to said neutral position; a supporting structure mounted on said body portion and provided with two spaced detent means disposed respectively in positions corresponding to the aforesaid right and left side positions of said lever means; latch means carried by said lever means and adapted to engage said detent means to cause said lever means to persist in one of said right and left side positions upon manual movement thereof to said position; a release member pivotally mounted on said supporting structure adjacent each of said detent means and biased toward normal positions for engagement by said latch means upon movement of said lever means to the respective right and left side positions, said latch means being adapted to bear against the respective release members when moved into engagement with the respective detent means to move such release member about its pivot to a displaced position; an actuating member secured to said relatively movable vehicle portion and constrained to move through a fixed path during a change in course of said vehicle, each of said release members being provided with a portion positioned in said fixed path when in said displaced position and movable out of said fixed path about its respective pivot upon engagement thereof by said actuating member, the release member associated with the right-side detent means being adapted to draw away from said latch means upon engagement of said portion of said release member by said actuating member in one direction corresponding to a change in course of said vehicle to the right and to move to normal position and force said latch means from said detent means upon engagement of said portion by said actuating member in the other direction corresponding to a change of course of the vehicle to the left, and the release member associated with the left-side detent means being adapted to draw away from said latch means upon engagement of said portion by said actuating member in said other direction and to move to normal position and force said latch means from said detent means upon engagement of said portion by said actuating member in said one direction.

VICTOR CRANFORD.